(12) United States Patent
Fukuda et al.

(10) Patent No.: US 12,143,482 B2
(45) Date of Patent: Nov. 12, 2024

(54) INFORMATION MATCHING SYSTEM AND INFORMATION MATCHING METHOD

(71) Applicant: NEC Corporation, Tokyo (JP)

(72) Inventors: Haruna Fukuda, Tokyo (JP);
Toshiyuki Isshiki, Tokyo (JP);
Masahiro Nara, Tokyo (JP); Hiroto Tamiya, Tokyo (JP); Toshihiko Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 337 days.

(21) Appl. No.: 17/763,306

(22) PCT Filed: Oct. 9, 2019

(86) PCT No.: PCT/JP2019/039781
§ 371 (c)(1),
(2) Date: Mar. 24, 2022

(87) PCT Pub. No.: WO2021/070275
PCT Pub. Date: Apr. 15, 2021

(65) Prior Publication Data
US 2022/0345302 A1 Oct. 27, 2022

(51) Int. Cl.
*H04L 9/08* (2006.01)
*G06F 21/60* (2013.01)
(Continued)

(52) U.S. Cl.
CPC .......... *H04L 9/0861* (2013.01); *G06F 21/602* (2013.01); *H04L 9/008* (2013.01); *H04L 9/14* (2013.01)

(58) Field of Classification Search
CPC ...................................................... H04L 9/08
See application file for complete search history.

(56) References Cited

U.S. PATENT DOCUMENTS

| 11,496,315 B1* | 11/2022 | Genner | ............ G06K 19/06037 |
| 2011/0035598 A1* | 2/2011 | Pizano | .................... H04L 63/06 |
| | | | 713/193 |

(Continued)

FOREIGN PATENT DOCUMENTS

| JP | 2016-131335 A | 7/2016 |
| JP | 2017-076839 A | 4/2017 |
| WO | 2011/052056 A1 | 5/2011 |

OTHER PUBLICATIONS

International Search Report for PCT Application No. PCT/JP2019/039781, mailed on Dec. 10, 2019.

(Continued)

*Primary Examiner* — Mohammad W Reza
(74) *Attorney, Agent, or Firm* — Michael Dryja

(57) ABSTRACT

A storing information generation apparatus obtains registration information and an identifier capable of identifying the registration information, to generate a first individual key from the common key and the identifier, and to generate storing information obtained by linearly converting the registration information using the common key and the first individual key. A matching information concealment apparatus obtains matching information to generate concealed matching information concealing the matching information using an encryption key. A concealed similarity calculation apparatus calculates a concealed similarity from the storing information and the concealed matching information. A decryption apparatus generates a second individual key from the common key and the identifier, and calculates a similarity between the registration information and the matching information from the concealed similarity, a decryption key corresponding to the encryption key, the common key, and the second individual key.

6 Claims, 10 Drawing Sheets

(51) Int. Cl.
   *H04L 9/00*     (2022.01)
   *H04L 9/14*     (2006.01)

(56) References Cited

U.S. PATENT DOCUMENTS

| | | | |
|---|---|---|---|
| 2012/0207299 A1* | 8/2012 | Hattori | H04L 9/3073 |
| | | | 380/30 |
| 2013/0251214 A1* | 9/2013 | Chung | G06V 40/19 |
| | | | 382/116 |
| 2015/0012742 A1 | 1/2015 | Gorelik et al. | |
| 2016/0204936 A1 | 7/2016 | Sakami et al. | |
| 2017/0104752 A1 | 4/2017 | Sakami et al. | |

OTHER PUBLICATIONS

Taher ElGamal "A public key cryptosystem and a signature scheme based on discrete logarithms." IEEE transactions on information theory 31.4 (1985), pp. 469-472.

Tamiya Hiroto et al. "Online Secret Biometric Authentication Method in Which Clients Have Templates"(in ISR), Proceedings of 2019 Symposium on Cryptography and Information Security (SCIS 2019), Jan. 15, 2019 ("A secure Online Biometric Authentication Scheme in Store-on-Client Verify-on-Server Model" in NPL).

* cited by examiner

INFORMATION MATCHING SYSTEM AND INFORMATION MATCHING METHOD This application is a National Stage Entry of PCT/JP2019/039781 filed on Oct. 9, 2019, the contents of all of which are incorporated herein by reference, in their entirety.

BACKGROUND

Technical Field

The present invention relates to an information matching system and an information matching method.

Background Art

Personal authentication is means for confirming identicalness between a registered person and a person to be authenticated. Information related to a registered person that is stored in advance is checked against information related to a person to be authenticated that is acquired every authentication to perform the personal authentication.

Biometric authentication as a method of personal authentication uses, physical characteristics such as a face, a fingerprint, and an iris to perform the authentication. To be more specific, data called a biometric feature is extracted from a biological body to be used for the authentication. The biometric feature extracted from the biological body is slightly different for every extraction. As such, in authentication, a biometric feature extracted from a registered person is compared with a biometric feature extracted from a person to be authenticated, and when these biometric features are recognized to be sufficiently similar to each other, the authentication is result in success. A similarity determination method depends on a biometric feature extraction scheme, and in general, a biometric feature is expressed in a form of a vector, a similarity is calculated by way of an inner product of two biometric features, a Euclidean distance, a Hamming distance, and the like, and then, in a case that the similarity is included in a predetermined range, two biometric features are determined to be sufficiently similar.

Merits of the biometric authentication, as compared to authentication by way of memorizing a password and the like, or authentication by way of carrying an IC card and the like, include higher convenience that an active preparation by a user such as the memorization and the carrying is not necessary for inputting authentication information, and higher security that the authentication information is not likely to be used by other persons. In recent years, the biometric authentication has been increasingly used as means for the personal authentication, along with development in technologies such as a biometric feature extraction method.

On the other hand, the biometric authentication has a demerit that biometric information unvarying whole life long cannot be changed even if leaked. A biometric feature of biological body is defined to fall under the personal information in the General Data Protection Regulation in Europe or the Personal Information Protection Law in Japan. Data falling under the personal information has a restriction in storing or handling such as provision to the outside. Not only the restriction by law or the like but also an attention for being socially accepted is often demanded.

Therefore, a biometric authentication scheme has been eagerly studied that the biometric information is stored in a concealed form, and an authentication result can be determined with the concealed state being kept. Furthermore, to make use of the merits of the biometric authentication, a preferable method is one in which the user does not need to memorize or carry anything other than the biometric information. As means for achieving the determination with the concealed state being kept, schemes using a public key cryptosystem with additive homomorphism are known.

The public key cryptosystem includes three algorithms of a key generation algorithm (KeyGen), an encryption algorithm (Enc), and a decryption algorithm (Dec).

The key generation algorithm uses a parameter indicating a strength of a key, called a security parameter, to generate an encryption key ek and a decryption key dk. This operation can be expressed as a relationship below, where the security parameter is represented by $\kappa$.

KeyGen($\kappa$)→(ek, dk)

The encryption algorithm generates a ciphertext c as a result of encrypting a plaintext message m by use of the encryption key ek. This can be expressed as a relationship below.

Enc(ek, m)→c

The decryption algorithm generates m' as a result of decrypting the ciphertext c by use of the decryption key dk. This can be expressed as a relationship below.

Dec(dk, c)→m'

The public key cryptosystem needs to be able to correctly decrypt the ciphertext. Specifically, as for any pair of encryption key ek and decryption key dk generated by the key generation algorithm, any message m which is encrypted by use of the encryption key ek to be a ciphertext c, and decryption result m' which is generated from the ciphertext c by use of the decryption key dk, m' is required to be equal to m.

Specifically, for KeyGen($\kappa$)→(ek, dk),

Dec(dk, Enc(ek, m))→m needs to be satisfied for any m.

In the public key cryptosystem, any device having an encryption key can perform the encryption algorithm, but cannot successfully perform the decryption algorithm without a decryption key.

A public key cryptosystem with homomorphism (hereinafter, referred to as a homomorphic public key encryption scheme) includes a homomorphic operation algorithm (HomAdd) in addition to the algorithms of the public key encryption scheme.

The homomorphic operation algorithm generates ciphertexts as a result of an operation performed on messages corresponding to a plurality of input ciphertexts by use of the encryption key. When two messages can be input, the algorithm can be expressed as a relationship below.

HomAdd(ek, $c_1$, $c_2$)→c

For example, in a case of a public key encryption scheme with additive homomorphism, the ciphertext c generated from the ciphertext $c_1$ of a message $m_1$ by use of the encryption key ek and the ciphertext $c_2$ of a message $m_2$ by use of the encryption key ek is a ciphertext of $m_1+m_2$. Specifically, assuming that, with respect to KeyGen($\kappa$)→(ek, dk), Enc(ek, $m_1$)→$c_1$, and Enc(ek, $m_2$)→$c_2$, Dec(dk, HomAdd(ek, $c_1$, $c_2$))→$m_1+m_2$ is satisfied for any $m_1$ and $m_2$.

In the case of public key encryption schemes with additive homomorphism, the number of messages that can be input to HomAdd is generally not limited, and for example, assuming that $c_j$ is a ciphertext of a message $m_j$ by the encryption key ek for all j=1, . . . , n, Dec(dk, Hom(ek, $c_1$, . . . , $c_n$))→$m_1$+ . . . +$m_j$ is satisfied.

In the case of public key encryption schemes with additive homomorphism, by repeatedly applying HomAdd to an identical ciphertext, a ciphertext of s*m can be calculated from a ciphertext c of the message m by the encryption key ek and a scalar value s.

By expressing this algorithm as HomScl,
with respect to KeyGen(κ)→(ek, dk) and
Enc(ek, m)→c,
Dec(dk, HomScl(ek, c, s))→s*m
are satisfied for any m and s.

The known public key encryption scheme with additive homomorphism includes the elliptic curve Elgamal encryption, or the like. Algorithms of the elliptic curve Elgamal encryption disclosed in NPL 1 operate as below.

The algorithms of the elliptic curve Elgamal encryption operate as below.

The key generation algorithm firstly receives a security parameter κ as an input. Next, the key generation algorithm chooses a κ-bit prime number q at random to choose a generator G of a group with an order q on an elliptic curve E. Next, the key generation algorithm chooses an integer x equal to or more than 1 and less than q uniformly at random, and obtains H=[x]G. Finally, the key generation algorithm outputs an encryption key ek=(κ, q, E, G, H) and a decryption key dk=(ek, x).

The encryption algorithm firstly receives the encryption key ek=(κ, q, G, g, H) and a message m as inputs. Next, the encryption algorithm chooses an integer r equal to or more than 1 and less then q uniformly at random, and obtains $C_a$:=[r]G, and $C_b$:=[m]G+[r]H. Finally, the encryption algorithm outputs a ciphertext c=($C_a$, $C_b$).

The decryption algorithm firstly receives the decryption key dk=(ek, x) and the ciphertext c=($C_a$, $C_b$) as inputs. Next, the decryption algorithm calculates M'=$C_b$−[x]$C_a$. Finally, the decryption algorithm outputs the decryption result m'=D $\log_G$(M'). Here, D log is a function satisfying D $\log_G$([x] G)=x.

As for the ciphertext c=($C_a$, $C_b$)=([r]G, [m]G+[r]H) of the message m, the ciphertext c can be correctly decrypted to m by the decryption algorithm of the elliptic curve Elgamal encryption, which can be confirmed by the equation below.

$$M'=C_b-[x]\cdot C_a=([m]G+[r]H)-[x]\cdot([r]G)=[m]G+[r]([x]\cdot G)-[x]\cdot([r]G)=[m]G$$

The homomorphic operation algorithm firstly receives the encryption key ek=(κ, q, G, g, h), a first ciphertext $c_1$=($C_{1,a}$, $C_{1,b}$), and a second ciphertext $c_2$=($C_{2,a}$, $C_{2,b}$) as inputs. Next, the homomorphic operation algorithm calculates $C_a$=$C_{1,a}$+$C_{2,a}$ and $C_b$=$C_{1,b}$+$C_{2,b}$. Finally, the homomorphic operation algorithm outputs a homomorphic operation result c=($C_a$, $C_b$).

For ciphertexts ($C_{1,a}$=[r]G, $C_{1,b}$=[$m_1$]G+[r]H) of the message $m_1$ and ciphertexts ($C_{2,a}$=[s]G, $C_{2,b}$=[$m_2$]G+[s]H) of the message $m_2$, two equations below are satisfied.

$$C_a=[r+s]\cdot G$$

$$C_b=[m_1+m_2]G+[r+s]H$$

Accordingly, c is a ciphertext of $m_1+m_2$, and the elliptic curve Elgamal encryption has additive homomorphism.

In recent years, cashless payment which does not use cash for payment in a shop has been propelled. At the time of filing the present application, means prevail for reading a card such as a credit card or a device such as a smartphone of a customer by a terminal of the shop. In the days ahead, it is predicted that, as means for reducing a burden on the customer and the shop, a payment means by use of biometric authentication without need for presentation or reading of the card or the smartphone further prevails. Specifically, personal authentication is performed using biometric information of the customer captured by a sensor such as a camera attached to the terminal in the shop to identify and charge a target (a person, a bank account, or an account) to be charged. By use of this scheme, the customer can complete a payment without presenting the payment means such as cash or a credit card.

As described above, the biometric information is subtle information, a management of which by a business operator involves a risk, so the business operator does not want the management. For achieving versatility that the same payment means is available for a plurality of business operators, it is inconvenient to need use of the biometric information managed by a business operator for matching at a payment. As such, there is a demand for achieving the cashless payment in a form of storing registered biometric information in a device such as the smartphone of the customer.

Furthermore, in order to prevent the biometric information from leakage, a desirable scheme is one capable of determining an authentication result without disclosing the biometric information between the device such as the smartphone and the terminal in the shop. Specifically, a scheme capable of matching a biometric feature of biological body stored in the smartphone of the customer and a biometric feature of biological body extracted by the terminal of the business operator in a state of being concealed from each other is demanded. As for such a scheme, for example, by using an additive homomorphic public key cryptosystem, the matching scheme can be achieved as below.

The terminal in the shop encrypts a biometric feature of a target customer extracted by the sensor using an additive homomorphic public key cryptosystem to send the encrypted biometric feature to the smartphone of the customer (step 1).

The smartphone of the customer calculates a ciphertext of a similarity by using the additive homomorphic operation of the stored biometric feature and the received encrypted biometric feature. The calculated encrypted similarity is sent to the terminal in the shop (step 2).

The terminal in the shop decrypts the encrypted similarity to obtain a similarity. If the similarity falls within a predefined range, the target customer is determined to be an owner of the smartphone, and an account of the target customer is charged to perform a payment (step 3).

CITATION LIST

Non Patent Literature

[NPL 1] Taher ElGamal. "A public key cryptosystem and a signature scheme based on discrete logarithms." IEEE transactions on information theory 31.4 (1985): 469-472.

SUMMARY

Technical Problem

The matching scheme using the additive homomorphic public key cryptosystem described above, in step 2, cannot assure whether or not the biometric feature used in the smartphone (the stored biometric feature) is correct, which may enable a fraudulent payment by spoofing. For example, if an attacker who thieves a smartphone of a certain user to perform a payment uses a biometric feature of the attacker instead of the biometric feature stored in step 2, the biometric feature of the attacker is sufficiently similar to the biometric feature extracted in step 1, and so the attacker is determined to be an owner of the smartphone in step 3 and an account of the owner of the smartphone is charged.

As such, demanded is a matching scheme that is similar to the scheme using the additive homomorphic public key cryptosystem described above, and further, can prevent the biometric feature used in the smartphone from being altered in any way. An example object of the present invention is to provide an information matching system and an information matching method that solve the problems described above.

Solution to Problem

According to a first example aspect of the present invention, an information matching system is provided, the information matching system including a common key generation apparatus, a storing information generation apparatus, a matching information concealment apparatus, a concealed similarity calculation apparatus, and a decryption apparatus, wherein the common key generation apparatus is configured to generate a common key, the storing information generation apparatus is configured to obtain registration information and an identifier capable of identifying the registration information, to generate a first individual key from the common key and the identifier, and to generate storing information obtained by linearly converting the registration information using the common key and the first individual key, the matching information concealment apparatus is configured to obtain matching information and to generate concealed matching information concealing the matching information using an encryption key, the concealed similarity calculation apparatus is configured to calculate a concealed similarity from the storing information and the concealed matching information, and the decryption apparatus is configured to generate a second individual key from the common key and the identifier, and to calculate a similarity between the registration information and the matching information from the concealed similarity, a decryption key corresponding to the encryption key, the common key, and the second individual key.

According to a second example aspect of the present invention, an information matching method is provided, in an information matching system including a common key generation apparatus, a storing information generation apparatus, a matching information concealment apparatus, a concealed similarity calculation apparatus, and a decryption apparatus, the method including generating, by the common key generation apparatus, a common key, obtaining, by the storing information generation apparatus, registration information and an identifier capable of identifying the registration information, to generate a first individual key from the common key and the identifier, and to generate storing information obtained by linearly converting the registration information using the common key and the first individual key, obtaining, by the matching information concealment apparatus, matching information and to generate concealed matching information concealing the matching information using an encryption key, calculating, by the concealed similarity calculation apparatus, a concealed similarity from the storing information and the concealed matching information, and generating, by the decryption apparatus, a second individual key from the common key and the identifier, and to calculate a similarity between the registration information and the matching information from the concealed similarity, a decryption key corresponding to the encryption key, the common key, and the second individual key.

Advantageous Effects of Invention

According to the example aspects of the present invention, an information matching system and an information matching method are provided that can match two pieces of information without being disclosed to each other, and disable matching using information other than registered information. Note that, according to the present invention, instead of or together with the above effects, other effects may be exerted.

DESCRIPTION OF THE EXAMPLE EMBODIMENTS

Figure 1:
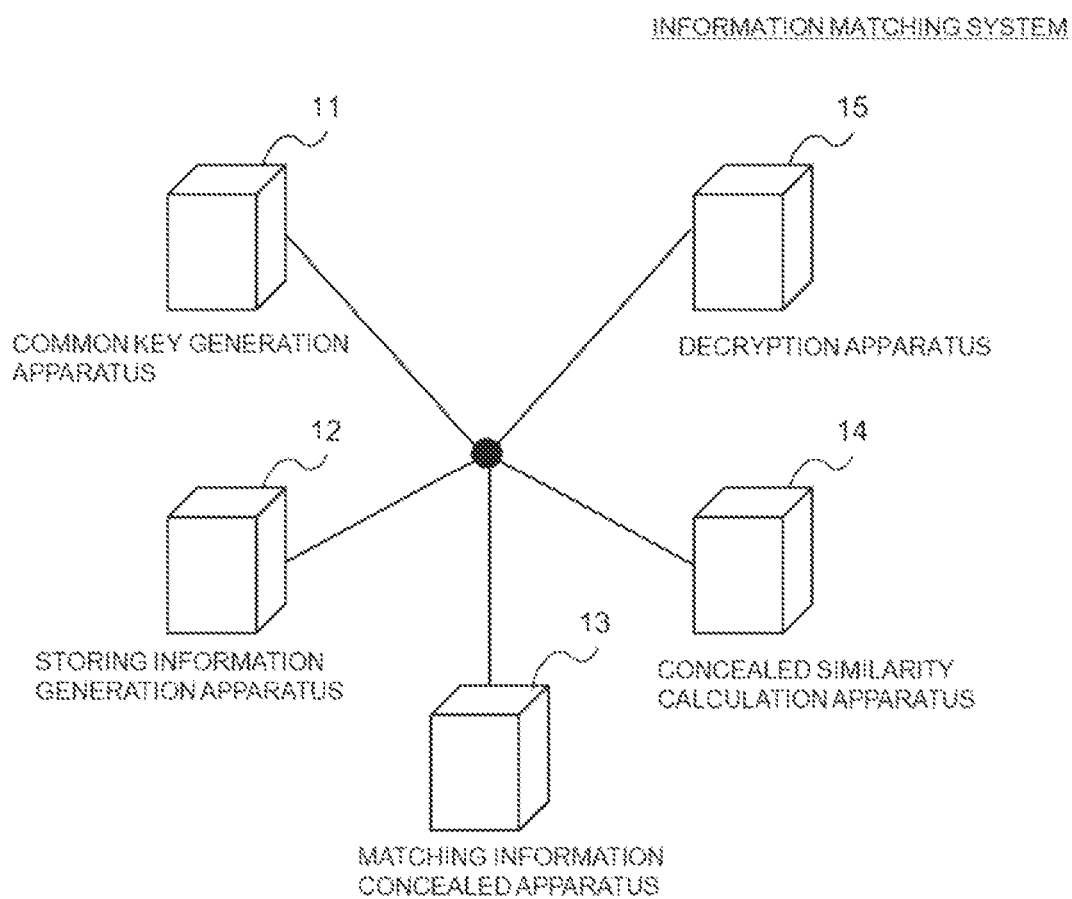
FIG. 1 is a diagram for describing an overview of an example embodiment.

First, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

The information matching system according to an example embodiment includes a common key generation apparatus 11, a storing information generation apparatus 12, a matching information concealment apparatus 13, a concealed similarity calculation apparatus 14, and a decryption apparatus 15 (see FIG. 1). The common key generation apparatus 11 generates a common key. The storing information generation apparatus 12 obtains registration information and an identifier capable of identifying the registration information, to generate a first individual key from the common key and the identifier, and to generate storing information obtained by linearly converting the registration information using the common key and the first individual key. The matching information concealment apparatus 13 obtains matching information to generate concealed matching information concealing the matching information using an encryption key. The concealed similarity calculation apparatus 14 calculates a concealed similarity from the storing information and the concealed matching information. The decryption apparatus 15 generates a second individual key from the common key and the identifier, and calculates a similarity between the registration information and the matching information from the concealed similarity, a decryption key corresponding to the encryption key, the common key, and the second individual key.

In the information matching system, the concealed matching information is transmitted to the concealed similarity calculation apparatus 14. Accordingly, the concealed similarity calculation apparatus 14 cannot know content of the matching information. The concealed similarity calculation apparatus 14 calculates the concealed similarity that is a concealed form of the similarity between the registration information and the matching information. The concealed similarity calculation apparatus 14 transmits the calculated concealed similarity to the decryption apparatus 15. Accordingly, the decryption apparatus 15 cannot know the storing information (the storing information that is a linearly converted form of the registration information). Therefore, between the concealed similarity calculation apparatus 14 and the decryption apparatus 15, the registration information and the matching information are not disclosed to each other but information matching can be performed. Furthermore, in the information matching system, if the storing information generation apparatus 12, which generates the storing information using the registration information and the common key, cannot use the common key, storing information for another piece of registration information is not generated. Accordingly, the matching cannot be performed using registration information other than registration information when the storing information is generated. In this way, in the information matching system, two pieces of information can be matched without being disclosed to each other, and the matching cannot be performed using information other than the registered information.

Hereinafter, specific example embodiments are described in more detail with reference to the drawings.

First Example Embodiment

A first example embodiment will be described in further detail with reference to the drawings.

Figure 2:
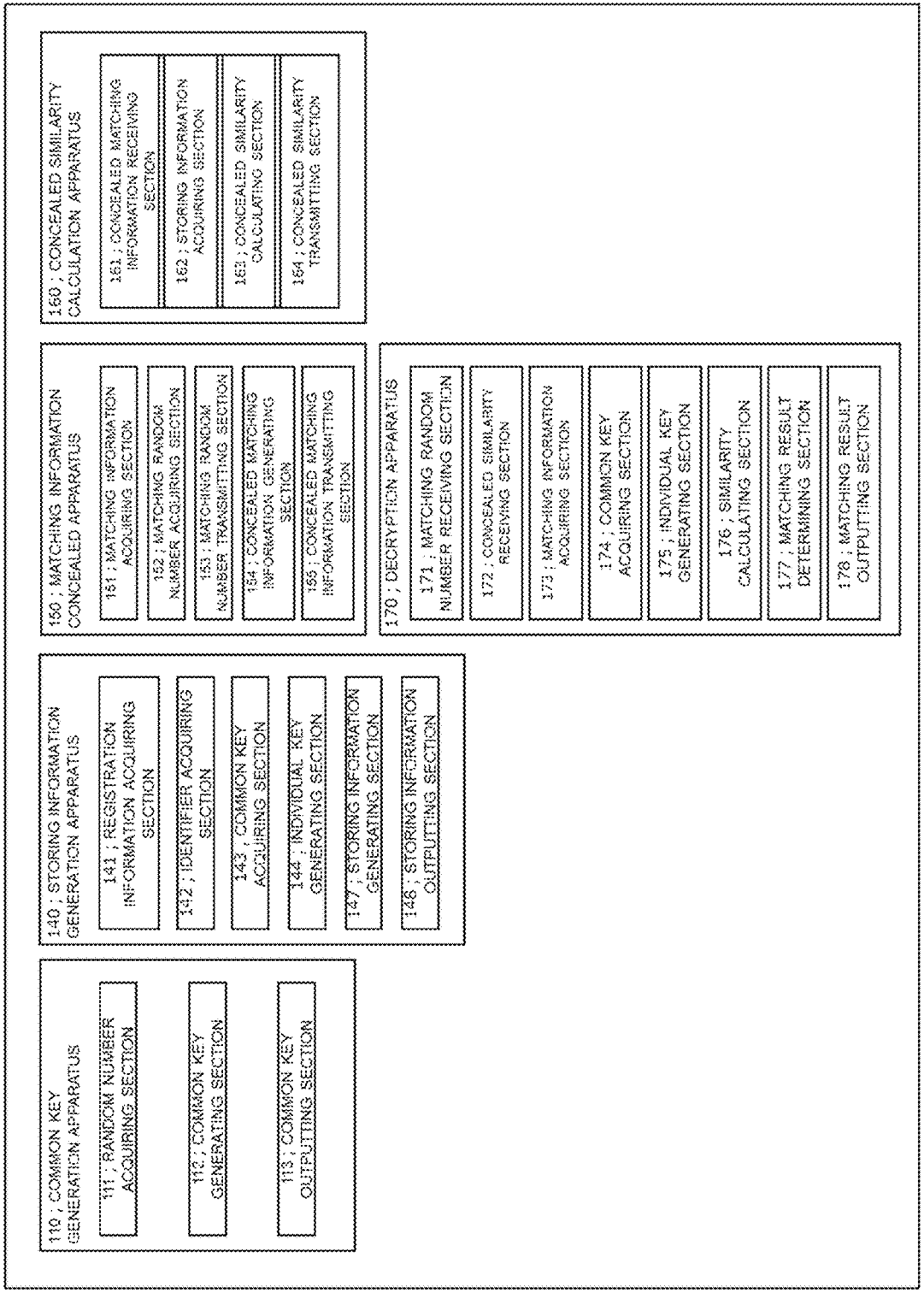
FIG. 2 is a block diagram illustrating a configuration of an information matching system (homomorphic encryption system) according to a first example embodiment.

FIG. 2 is a block diagram illustrating a configuration of an information matching system 100 according to the first example embodiment. The information matching system 100 includes a common key generation apparatus 110, a storing information generation apparatus 140, a matching information concealment apparatus 150, a concealed similarity calculation apparatus 160, and a decryption apparatus 170. Here, the apparatuses included in the information matching system 100 may be configured as separate apparatuses, or may be adequately mounted on an identical apparatus depending on a usage. For example, the information matching system 100 can be achieved as a client-server system by separately mounting the concealed similarity calculation apparatus 160 on a client, and the common key generation apparatus 110, the storing information generation apparatus 140, the matching information concealment apparatus 150, and the decryption apparatus 170 on a server.

Figure 3:
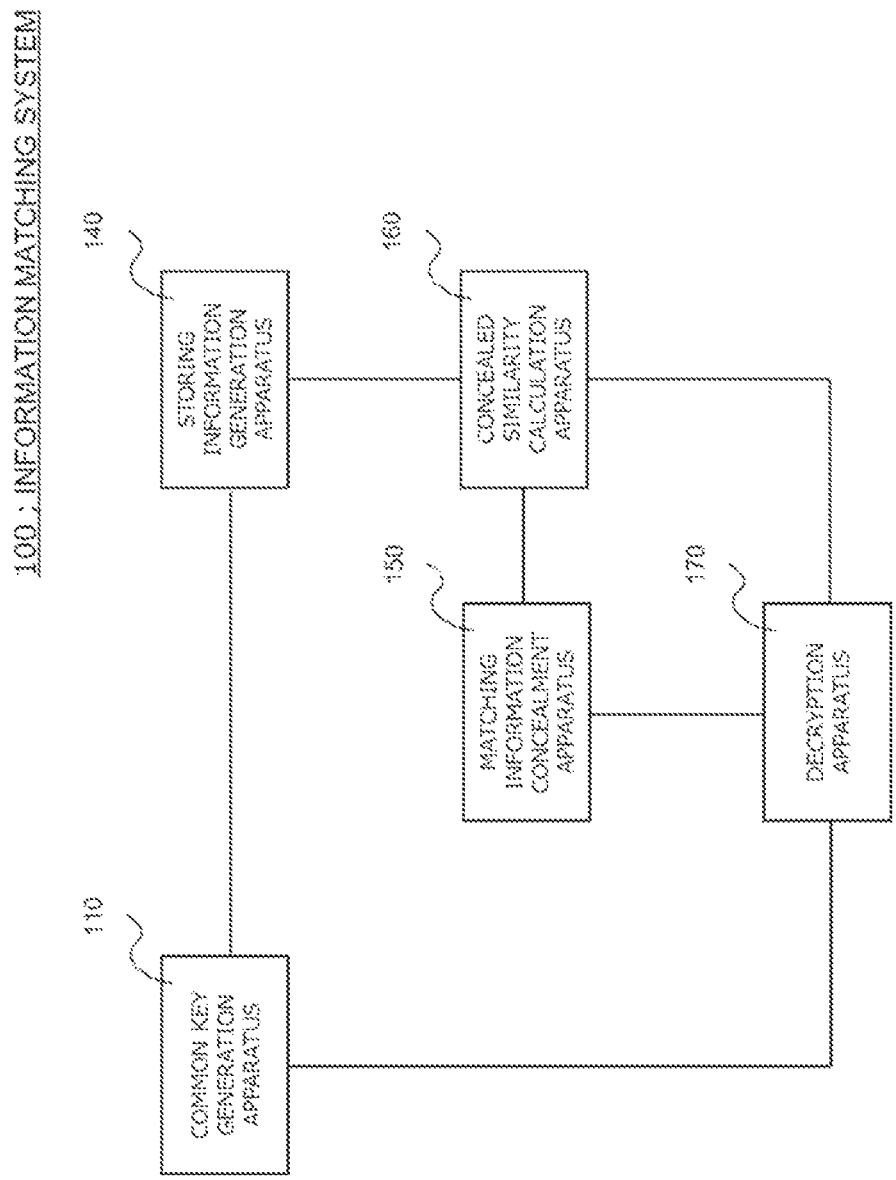
FIG. 3 is a diagram illustrating a connection example of apparatuses included in the information matching system according to the first example embodiment.

The apparatuses illustrated in FIG. 2 (the common key generation apparatus 110, the storing information generation apparatus 140, the matching information concealment apparatus 150, the concealed similarity calculation apparatus 160, and the decryption apparatus 170) are connected in a wired or wireless manner and configured to be communicable with each other. For example, the apparatuses included in the information matching system 100 are connected as illustrated in FIG. 3.

The common key generation apparatus 110 includes
a random number acquiring section 111 that acquires random numbers,
a common key generating section 112 that generates a common key using random numbers acquired by the acquiring section 111, and
a common key outputting section 113 that outputs the common key generated by the common key generating section 112.

The storing information generation apparatus 140 includes
a registration information acquiring section 141 that acquires registration information,
an identifier acquiring section 142 that acquires an identifier,
a common key acquiring section 143 that acquires the common key output by the common key generation apparatus 110,
an individual key generating section 144 that generates an individual key from the identifier acquired by the identifier acquiring section 142 and the common key acquired by the common key acquiring section 143,
a storing information generating section 147 that generates storing information from the registration information acquired by the registration information acquiring section 141 and the individual key generated by the individual key generating section 144, and
a storing information outputting section 148 that outputs the storing information generated by the storing information generating section 147.

The matching information concealment apparatus 150 includes
a matching information acquiring section 151 that acquires matching information,
a matching random number acquiring section 152 that acquires matching random numbers,
a matching random number transmitting section 153 that transmits the matching random numbers acquired by the matching random number acquiring section 152,
a concealed matching information generating section 154 that generates concealed matching information from the matching information acquired by the matching information acquiring section 151 and the matching random numbers acquired by the matching random number acquiring section 152, and
a concealed matching information transmitting section 155 that transmits the concealed matching information generated by the concealed matching information generating section 154.

The concealed similarity calculation apparatus 160 includes
a concealed matching information receiving section 161 that receives the concealed matching information, a storing information acquiring section 162 that acquires the identifier and the registration information, a concealed similarity calculating section 163 that calculates a concealed similarity from the concealed matching information received by the concealed matching information receiving section 161 and the storing information acquired by the storing information acquiring section 162, and a concealed similarity transmitting section 164 that transmits the identifier acquired by the storing information acquiring section 162 and the concealed similarity calculated by the concealed similarity calculating section 163.

The decryption apparatus 170 includes a matching random number receiving section 171 that receives the matching random numbers, a concealed similarity receiving section 172 that receives the identifier and the concealed similarity, a matching information acquiring section 173 that acquires the matching information, a common key acquiring section 174 that acquires the common key, an individual key generating section 175 that generates an individual key from the identifier received by the concealed similarity receiving section 172 and the common key acquired by the common key acquiring section 174, a similarity calculating section 176 that calculates a similarity from the matching random number received by matching random number receiving section 171, the concealed similarity received by the concealed similarity receiving section 172, the matching information acquired by the matching information acquiring section 173, and the individual key generated by the individual key generating section 175, a matching result determining section 177 that determines a matching result on the basis of the similarity calculated by the similarity calculating section 176, and a matching result outputting section 178 that outputs the matching result determined by the matching result determining section 177.

[Description of Operation]

Next, with reference to the drawings, an entire operation according to the present example embodiment will be described. The operation according to the present example embodiment can be divided into three phases, a common key generation phase, a storing information generation phase, and a matching phase. Hereinafter, the operations in the respective phases are described in detail.

Figure 4:
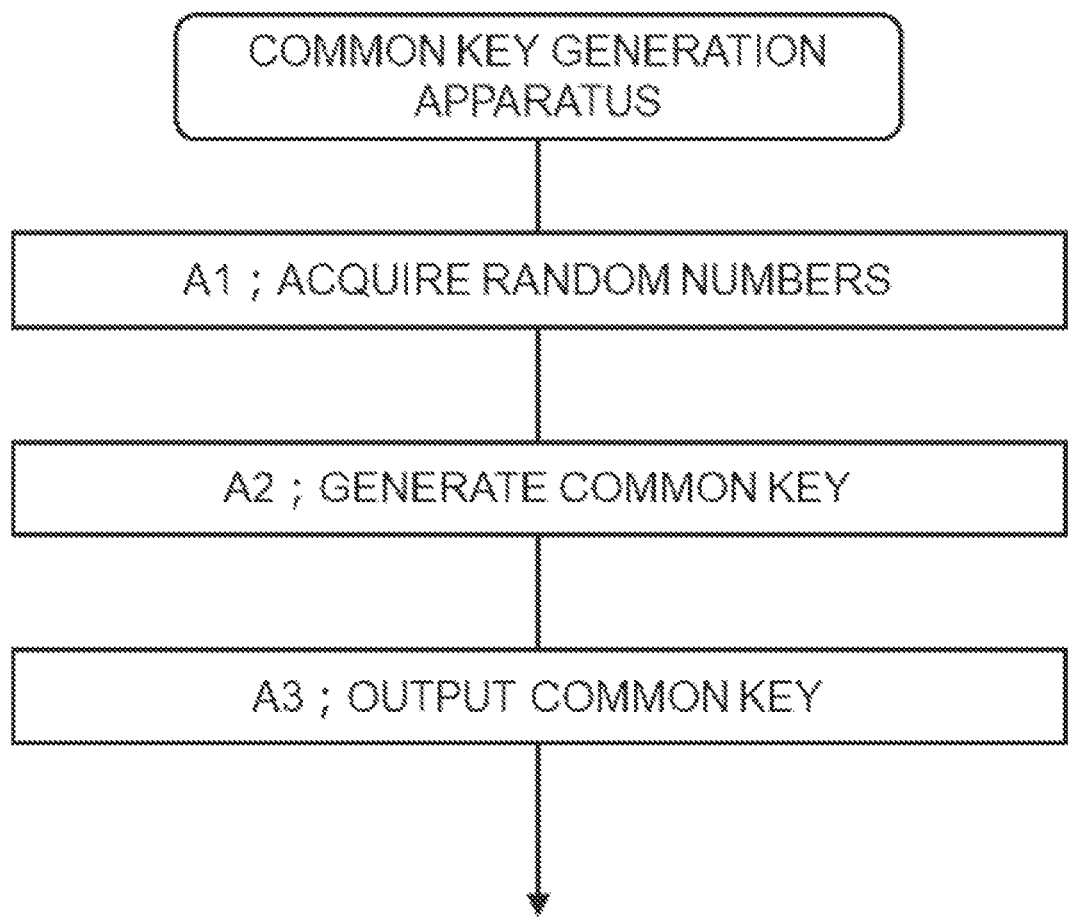
FIG. 4 is a flow diagram illustrating an operation in a common key generation phase of the information matching system according to the first example embodiment.

In the common key generation phase according to the present example embodiment, the common key generation apparatus 110 in the information matching system 100 operates. With reference to FIG. 4, the operation in the common key generation phase according to the present example embodiment will be described in detail.

First, the random number acquiring section 111 in the common key generation apparatus 110 acquires random numbers (step A1). Note that the random numbers may be acquired in any way. For example, the random numbers may be generated using a random number generating function that the common key generation apparatus 110 has therein, or random numbers generated outside the common key generation apparatus 110 may be acquired from an external apparatus.

Next, the common key generating section 112 generates a common key using the random numbers acquired by the random number acquiring section 111 (step A2).

Finally, the common key outputting section 113 outputs the common key generated by the common key generating section 112 (step A3). The output common key is stored by a proper means to be used in the storing information generation phase by the storing information generation apparatus 140, and in the matching phase by the decryption apparatus 170.

Figure 5:
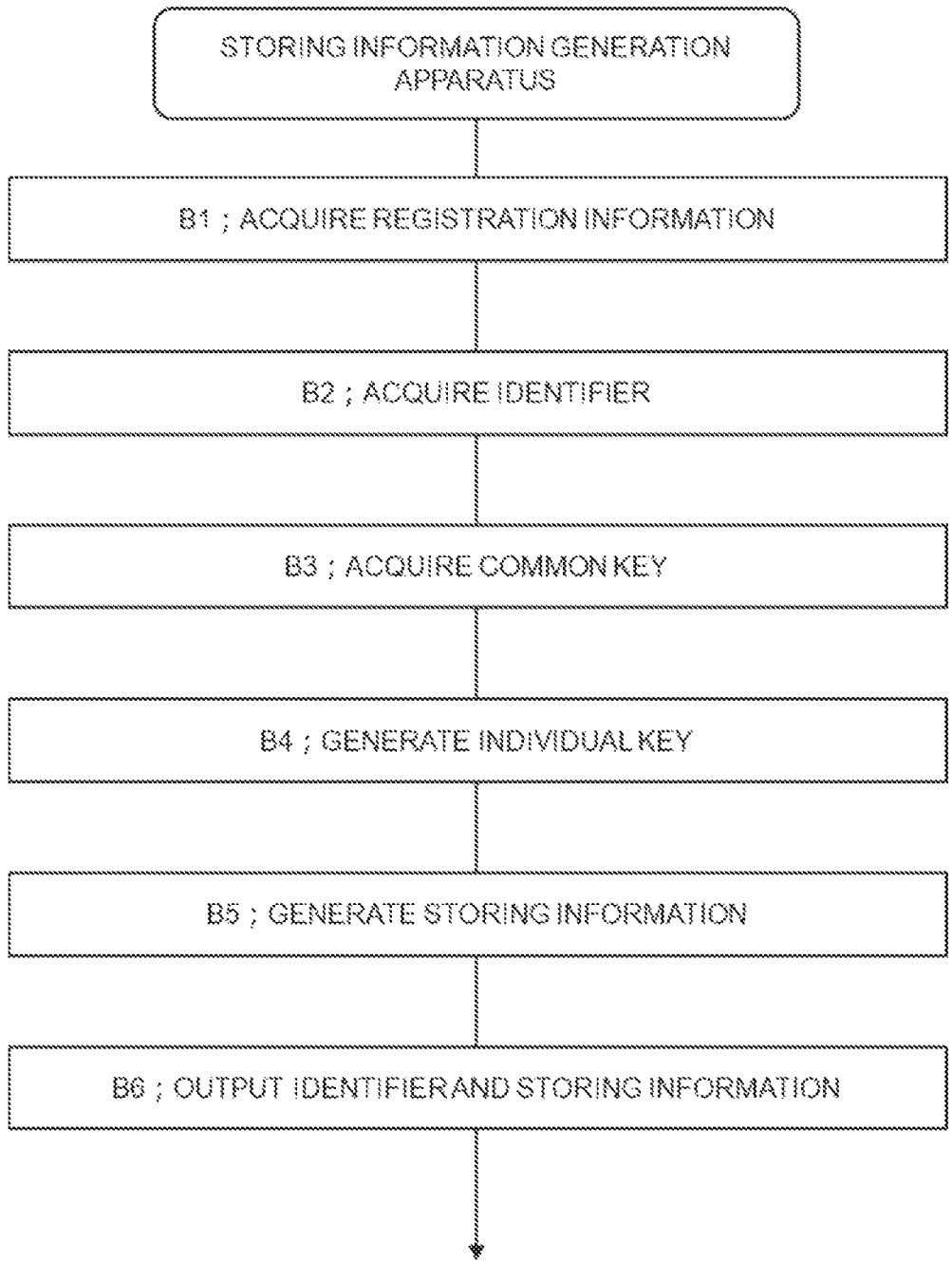
FIG. 5 is a flow diagram illustrating an operation in a storing information generation phase of the information matching system according to the first example embodiment.

In the storing information generation phase according to the present example embodiment, the storing information generation apparatus 140 in the information matching system 100 operates. With reference to FIG. 5, the operation in the storing information generation phase according to the present example embodiment will be described in detail.

First, the registration information acquiring section 141 in the storing information generation apparatus 140 acquires registration information (step B1). Note that the registration information may be acquired in any way. For example, the registration information acquiring section 141 may externally acquire the registration information using an input means such as a sensor attached to the storing information generation apparatus 140.

Next, the identifier acquiring section 142 acquires an identifier (step B2). The identifier is associated with the registration information. For example, in a case that the registration information is biometric information of a person, the identifier may be an identifier indicating a target person. For example, in the case that the registration information is biometric information of a person, and that the storing information generation phase is executed for an identical person a plurality of times, the identifier may be one obtained by combining an identifier indicating a target person and an identifier regarding the number of executions of the storing information generation phase.

Next, the common key acquiring section 143 acquires the common key output by the common key generation apparatus 110 in step A3 (step B3). Note that the common key may be acquired in any way. For example, the common key may be stored in advance in a storing means provided in the storing information generation apparatus 140, or a common key may be acquired every time from a storing means outside the storing information generation apparatus 140.

Next, the individual key generating section 144 generates an individual key from the identifier acquired by the identifier acquiring section 142 in step B2 and the common key acquired by the common key acquiring section 143 in step B3 (step B4).

Next, the storing information generating section 147 generates storing information from the registration information acquired by the registration information acquiring section 141 in step B1 and the individual key generated by the individual key generating section 144 in step B4 (step B5).

Finally, the storing information outputting section 148 outputs a pair of the identifier acquired by the identifier acquiring section 142 in step B2 and the storing information generated by the storing information generating section 147 in step B5 (step B6). The output identifier and storing information are stored by a proper means to be used in the matching phase by the concealed similarity calculation apparatus 160.

Figure 6:
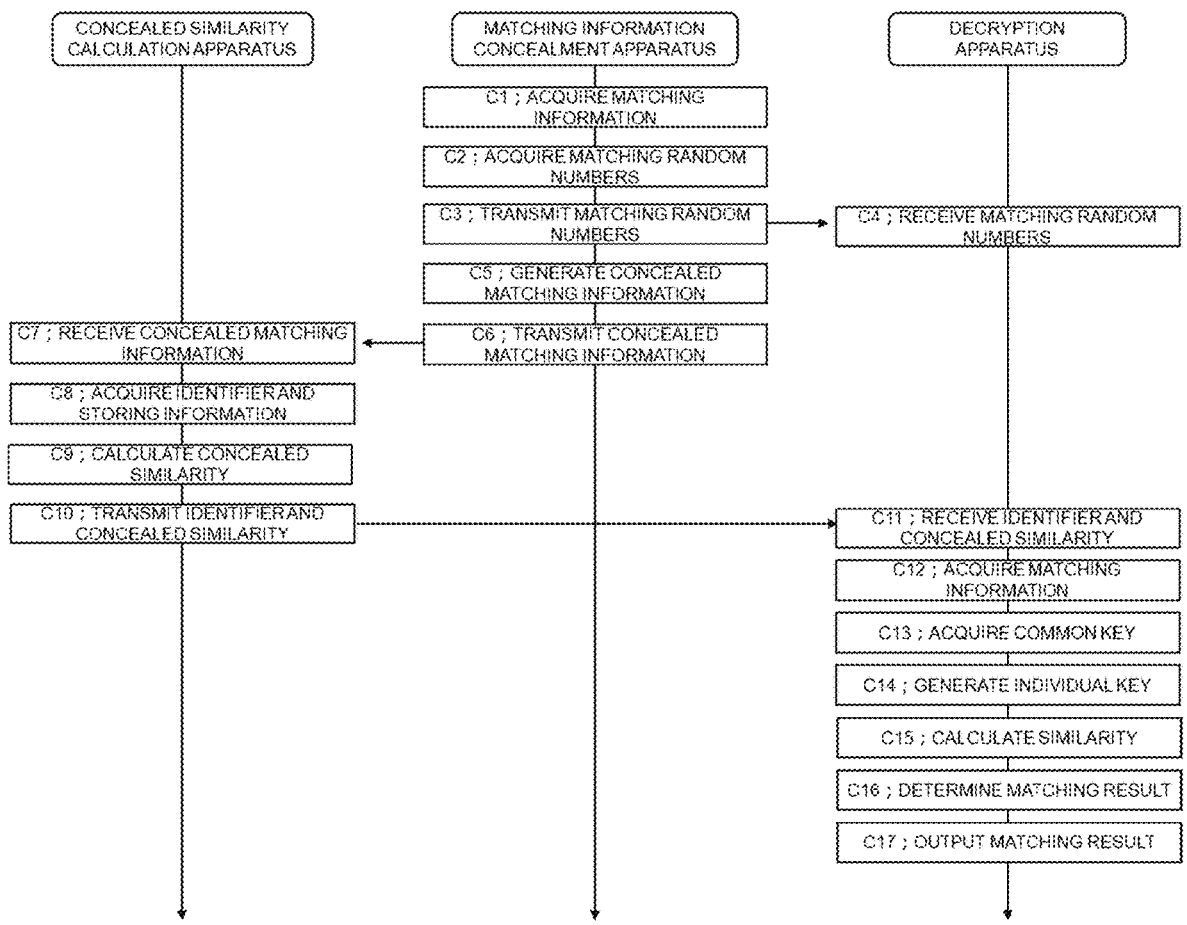
FIG. 6 is a flow diagram illustrating an operation in a matching phase of the information matching system according to the first example embodiment.

In the matching phase according to the present example embodiment, the matching information concealment apparatus 150, the concealed similarity calculation apparatus 160, and the decryption apparatus 170 in the information matching system 100 operate. With reference to FIG. 6, the operation in the matching phase according to the present example embodiment will be described in detail.

First, the matching information acquiring section 151 in the matching information concealment apparatus 150 acquires matching information (step C1). Note that the matching information may be acquired in any way. For example, the matching information may be externally acquired using an input means such as a sensor attached to the matching information concealment apparatus 150.

Next, the matching random number acquiring section 152 acquires random numbers (step C2). Hereinafter, the random numbers are referred to as the matching random numbers.

Note that the random numbers may be acquired in any way. For example, the random numbers may be generated using a random number generating function that the matching information concealment apparatus 150 has therein, or random numbers generated outside the matching information concealment apparatus 150 may be acquired. Part or all of the matching random numbers may not be changed every time the matching phase is executed, but may be stored inside or outside the matching information concealment apparatus 150 to be reused.

Next, the matching random number transmitting section 153 transmits the matching random numbers acquired in step C2 to the decryption apparatus 170 (step C3).

Next, the matching random number receiving section 171 in the decryption apparatus 170 receives the matching random numbers transmitted from the matching information concealment apparatus 150 in step C3 (step C4).

Next, the concealed matching information generating section 154 in the matching information concealment apparatus 150 conceals the matching information acquired by the matching information acquiring section 151 in step C1 using the matching random numbers acquired by the matching random number acquiring section 152 in step C2 to generate concealed matching information (step C5).

Next, the concealed matching information transmitting section 155 transmits the concealed matching information generated by the concealed matching information generating section 154 in step C5 to the concealed similarity calculation apparatus 160 (step C6).

Note that a plurality of concealed similarity calculation apparatuses 160 may be provided for one matching information concealment apparatus 150, and in such a case, the concealed matching information is transmitted to the plurality of concealed similarity calculation apparatuses 160 in step C6.

Next, the concealed matching information receiving section 161 in the concealed similarity calculation apparatus 160 receives the concealed matching information transmitted from the matching information concealment apparatus 150 in step C6 (step C7).

Next, the storing information acquiring section 162 acquires the pair of the identifier and the storing information output by the storing information generation apparatus 140 in step B6 (step C8).

Note that the identifier and the storing information may be acquired in any way. For example, the identifier and the storing information may be stored in advance in a storing means provided in the concealed similarity calculation apparatus 160, or these pieces of information may be acquired every time from a storing means outside the concealed similarity calculation apparatus 160.

Next, the concealed similarity calculating section 163 calculates a concealed similarity from the concealed matching information received by the concealed matching information receiving section 161 in step C7 and the storing information acquired by the storing information acquiring section 162 in step C8 (step C9).

Next, the concealed similarity transmitting section 164 transmits the identifier acquired by the storing information acquiring section 162 in step C8 and the concealed similarity calculated by the concealed similarity calculating section 163 in step C9 to the decryption apparatus 170 (step C10).

Next, the concealed similarity receiving section 172 in the decryption apparatus 170 receives the identifier and the concealed similarity transmitted from the concealed similarity calculation apparatus 160 in step C10 (step C11). Note that a plurality of concealed similarity calculation apparatuses 160 may be provided for one decryption apparatus 170, and in such a case, a plurality of sets of the identifiers and the concealed similarities are received in step C11.

Next, the matching information acquiring section 173 acquires the matching information acquired by the matching information concealment apparatus 150 in step C1 (step C12). Note that the matching information may be acquired in any way. For example, the matching information may be acquired from the matching information concealment apparatus 150, or the matching information may be acquired by means the same as the matching information concealment apparatus 150 at the same time as step C1.

Next, the common key acquiring section 174 acquires the common key output by the common key generation apparatus 110 in step A3 (step C13). Note that the common key may be acquired in any way. For example, the common key may be stored in advance in a storing means provided in the decryption apparatus 170, or a common key may be acquired every time from a storing means outside the decryption apparatus 170.

Next, the individual key generating section 175 generates an individual key from the identifier received by the concealed similarity receiving section 172 in step C11 and the common key acquired by the common key acquiring section 174 in step C13 (step C14). Note that in the case that a plurality of concealed similarity calculation apparatuses 160 are provided for one decryption apparatus 170, an individual key is generated for each of the identifiers received in step C11.

Next, the similarity calculating section 176 calculates a similarity from the matching random numbers received by the matching random number receiving section 171 in step C4, the concealed similarity received by the concealed similarity receiving section 172 in step C11, the matching information acquired by the matching information acquiring section 173 in step C12, the common key acquired by the common key acquiring section 174 in step C13, and the individual key generated by the individual key generating section 175 in step C14 (step C15).

Note that in the case that a plurality of concealed similarity calculation apparatuses 160 are provided for one decryption apparatus 170, a similarity is calculated for each of the sets of the identifiers and the concealed similarities received in step C11.

Next, the matching result determining section 177 determines a matching result on the basis of the similarity calculated by the similarity calculating section 176 in step C15 (step C16). Note that in the case that a plurality of concealed similarity calculation apparatuses 160 are provided for one decryption apparatus 170, a matching result is determined from a plurality of similarities calculated in step C15. For example, an identifier having the highest similarity may be determined as the matching result, or the sets of the identifiers and the similarities arranged in a descending order of the similarity may be determined as a matching result.

Finally, the matching result outputting section 178 outputs the matching result determined by the matching result determining section 177 in step C16 (step C17).

Note that the order of performing the steps is not limited to that described above. For example, before acquiring the matching information in step C1, steps independent from the matching information (transmitting the identifier in steps C2, C3, C4, C8, and C10, receiving the identifier in step C11, steps C13 and C14) may be performed.

Concrete Example according to First Example Embodiment

Next, a concrete example of the operation of the information matching system 100 according to the present example embodiment will be described.

In this concrete example, a case that the ECElgamal encryption scheme is used will be described. Assume that a group with an order of a κ-bit prime number q on an elliptic curve E and a generator G of the group are published.

In this concrete example, a hash function is used. Although the hash function to be used is not limited, assume that the storing information generation apparatus 140 and the decryption apparatus 170 have knowledge of the hash function to be used, in advance. Hereinafter, the hash function to be used is referred to as Hash.

In this concrete example, a case that a vector (with a dimension number of D) is used as the matching information and the registration information will be described. Furthermore, a case that the similarity between the matching information and the registration information is calculated by use of the inner product of the two vectors will be described. Assume a case that the matching information and the registration information are determined to be sufficiently similar to each other is a case that a similarity calculated by use of the inner product of the matching information and the registration information matches any one of T values $\theta_1, \ldots,$ and $\theta_T$.

The operation in the common key generation phase according to this concrete example will be described.

First, the random number acquiring section 111 in the common key generation apparatus 110 acquires two random numbers a and K equal to or more than 1 and less than q (step A1).

Next, the common key generating section 112 uses, as a common key, the pair of the random numbers (a, K) acquired by the random number acquiring section 111 (step A2).

Finally, the common key outputting section 113 outputs the common key (a, K) generated by the common key generating section 112 (step A3).

The operation in the storing information generation phase according to this concrete example will be described.

First, the registration information acquiring section 141 in the storing information generation apparatus 140 acquires, as the registration information, a D-dimensional vector:
$x=(x_1, \ldots, x_D)$
(step B1).

Next, the identifier acquiring section 142 acquires an identifier ID (step B2).

Next, the common key acquiring section 143 acquires the common key (a, K) output by the common key generation apparatus 110 in step A3 (step B3).

Next, the individual key generating section 144 calculates hash values $h_{ID, j}=\text{Hash}(K, ID, j)$ for all j=1, ..., D,
from the identifier ID acquired by the identifier acquiring section 142 in step B2 and the common key (a, K) acquired by the common key acquiring section 143 in step B3 to obtain individual keys as $(h_{ID, 1}, \ldots, h_{ID, D})$ (step B4).

Next, the storing information generating section 147 calculates $z_{ID, j}=a(x_j-h_{ID, j})$ for all j=1, ..., D,
from registration information $x=(x_1, \ldots, x_D)$ acquired by the registration information acquiring section 141 in step B1,
the common key (a, K) acquired by the common key acquiring section 143 in step B3, and
the individual keys $(h_{ID, 1}, \ldots, h_{ID, D})$ generated by the individual key generating section 144 in step B4
to obtain storing information as $z_{ID}= \ldots, z_{ID, 1}, \ldots, z_{ID, D})$ (step B5).

Note that $Z_{ID, j}=a(x_j-h_{ID, j})$ calculated in generating the storing information corresponds to the linear conversion of the registration information.

Finally, the storing information outputting section 148 outputs a pair of the identifier ID acquired by the identifier acquiring section 142 in step B2 and the storing information zip generated by the storing information generating section 147 in step B5 (step B6).

The operation in the matching phase according to this concrete example will be described.

First, the matching information acquiring section 151 in the matching information concealment apparatus 150 acquires, as the matching information, a D-dimensional vector:
$y=(y_1, \ldots, y_D)$
(step C1).

Next, the matching random number acquiring section 152 acquires a random number r equal to or more than 1 and less than q, and an encryption key ek and a decryption key dk by performing a key generation algorithm of the ECElgamal encryption scheme (step C2).

Next, the matching random number transmitting section 153 transmits, as the matching random numbers, (r, ek, dk) acquired in step C2 to the decryption apparatus 170 (step C3).

Next, the matching random number receiving section 171 in the decryption apparatus 170 receives the matching random numbers (r, ek, dk) transmitted from the matching information concealment apparatus 150 in step C3 (step C4).

Next, the concealed matching information generating section 154 in the matching information concealment apparatus 150 first calculates $Y_j=\text{Enc}(ek, r*y_j)$ for all j=1, ..., D,
from the matching information $y=(y_1, \ldots, y_D)$ acquired by the matching information acquiring section 151 in step C1 of the ECElgamal encryption scheme and
the values (r, ek, dk) acquired by the matching random number acquiring section 152 in step C2
to obtain the pair of ek and $Y=(Y_1, \ldots, Y_D)$ as the concealed matching information (step C5).

Next, the concealed matching information transmitting section 155 transmits the concealed matching information (ek, Y) generated by the concealed matching information generating section 154 in step C5 to the concealed similarity calculation apparatus 160 (step C6).

Next, the concealed matching information receiving section 161 in the concealed similarity calculation apparatus 160 receives the concealed matching information (ek, Y)

transmitted from the matching information concealment apparatus 150 in step C6 (step C7).

Next, the storing information acquiring section 162 acquires the pair (ID, $z_{ID}$) of the identifier and the storing information output by the storing information generation apparatus 140 in step B6 (step C8).

Next, the concealed similarity calculating section 163 calculates $$Z_{ID}=\text{HomAdd}(ek, \text{HomScl}(ek, Y_1, z_{ID, 1}), \ldots, \text{HomScl}(ek, Y_D, z_{ID, D}))$$

from the concealed matching information (ek, $Y=(Y_1, \ldots, Y_D)$) received by the concealed matching information receiving section 161 in step C7 and
the storing information $z_{ID}(z_{ID, 1}, \ldots, z_{ID, D})$ acquired by the storing information acquiring section 162 in step C8 to obtain $Z_{ID}$ as the concealed similarity (step C9).

Note that, for all $j=1, \ldots, D$, because $$Y_j=\text{Enc}(ek, r \cdot y_j)$$

and $$z_{ID, j}=a(x_j - h_{ID, j})$$

are satisfied, $$Z_{ID}=\text{Enc}(ek, ar(\Sigma x_j \cdot y_j - \Sigma h_{ID, j} \cdot y_j))$$

is satisfied.

Next, the concealed similarity transmitting section 164 transmits
a pair of
the identifier ID acquired by the storing information acquiring section 162 in step C8 and
the concealed similarity $Z_{ID}$ calculated by the concealed similarity calculating section 163 in step C9
to the decryption apparatus 170 (step C10).

Next, the concealed similarity receiving section 172 in the decryption apparatus 170 receives the pair (ID, $Z_{ID}$) of the identifier and the concealed similarity transmitted by the concealed similarity calculation apparatus 160 in step C10 (step C11).

Next, the matching information acquiring section 173 acquires the matching information $y=(y_1, \ldots, y_D)$ acquired by the matching information concealment apparatus 150 in step C1 (step C12).

Next, the common key acquiring section 174 acquires the common key (a, K) output by the common key generation apparatus 110 in step A3 (step C13).

Next, the individual key generating section 175 calculates hash values $h_{ID, j}=\text{Hash}(K, ID, j)$ for all $j=1, \ldots, D$
from the identifier ID received by the concealed similarity receiving section 172 in step C11 and
the common key (a, K) acquired by the common key acquiring section 174 in step C13 to obtain individual keys $h_{ID}=(h_{ID, 1}, \ldots, h_{ID, D})$ (step C14).

Next, the similarity calculating section 176 calculates a similarity s
as Dec(dk, HomAdd(ek, HomScl(ek, $Z_{ID}$, 1/ar), Enc(ek, $\Sigma h_{ID, j} \cdot y_j$)))
from the matching random number (r, ek, dk) received by the matching random number receiving section 171 in step C4,
the concealed similarity $Z_{ID}$ received by the concealed similarity receiving section 172 in step C11,
the matching information $y=(y_1, \ldots, y_D)$ acquired by the matching information acquiring section 173 in step C12,
the common key (a, K) acquired by the common key acquiring section 174 in step C13, and
the individual keys $h_{ID}=(h_{ID, 1}, \ldots, h_{ID, D})$ generated by the individual key generating section 175 in step C14 (step C15).

Note that because $Z_{ID}=\text{Enc}(ek, ar(\Sigma x_j \cdot y_j - \Sigma h_{ID, j} \cdot y_j))$ is satisfied, HomScl(ek, $Z_{ID}$, 1/ar)=Enc(ek, $\Sigma x_j \cdot y_j - \Sigma h_{ID, j} \cdot y_j$) is satisfied, and thus, HomAdd(ek, HomScl(ek, $Z_{ID}$, 1/ar), Enc(ek, $\Sigma h_{ID, j} \cdot y_j$)) =Enc(ek, $\Sigma x_j \cdot y_j$) is satisfied to calculate $s=\Sigma x_j \cdot y_j$.

Next, the matching result determining section 177 checks whether or not the similarity s calculated by the similarity calculating section 176 in step C15 matches any one of T values $\theta_1, \ldots,$ and $\theta_\tau$ to determine a matching result (step C16).

Finally, the matching result outputting section 178 outputs the matching result determined by the matching result determining section 177 in step C16 (step C17).

Among the matching random numbers (r, ek, dk) generated in step C2 in this concrete example, r is selected every time executing the matching phase to bring about an effect of preventing replay attack, but is not an essential constituent in the present application disclosure. A communication path encryption scheme such as SSL/TLS can be used as an alternative.

Among the matching random numbers (r, ek, dk) generated in step C2 inf this concrete example, (ek, dk) may not be selected every time executing the matching phase, but the same values are permitted to be used every time. The matching random numbers may be generated in the common key generation phase so that the generated matching random numbers are given in advance.

[Description of Effect]

The present example embodiment described above has an effect that the registration information and the matching information can be matched without being disclosed to each other, and an effect that the matching cannot be performed using the registration information other than the registration information used in the storing information generation phase. The reason why the registration information and the matching information can be matched without being disclosed to each other is that, in the matching phase, the matching information concealment apparatus 150 transmits (sends) the concealed matching information concealing the matching information to the concealed similarity calculation apparatus 160, so, the matching information is not disclosed to the concealed similarity calculation apparatus 160, and the concealed similarity calculation apparatus 160 calculates the concealed similarity that is the value obtained by concealing the similarity between the registration information and matching information to transmit the calculated concealed similarity to the decryption apparatus 170, so the storing information is not disclosed to the decryption apparatus 170.

The reason why the registration information other than the registration information used in the storing information generation phase cannot be used is that, in the storing information generation phase, the storing information generation apparatus 140 generates the storing information using registration information and the common key, so storing information for another piece of registration information cannot be generated without the common key.

Second Example Embodiment

[Description of Configuration]

Figure 7:
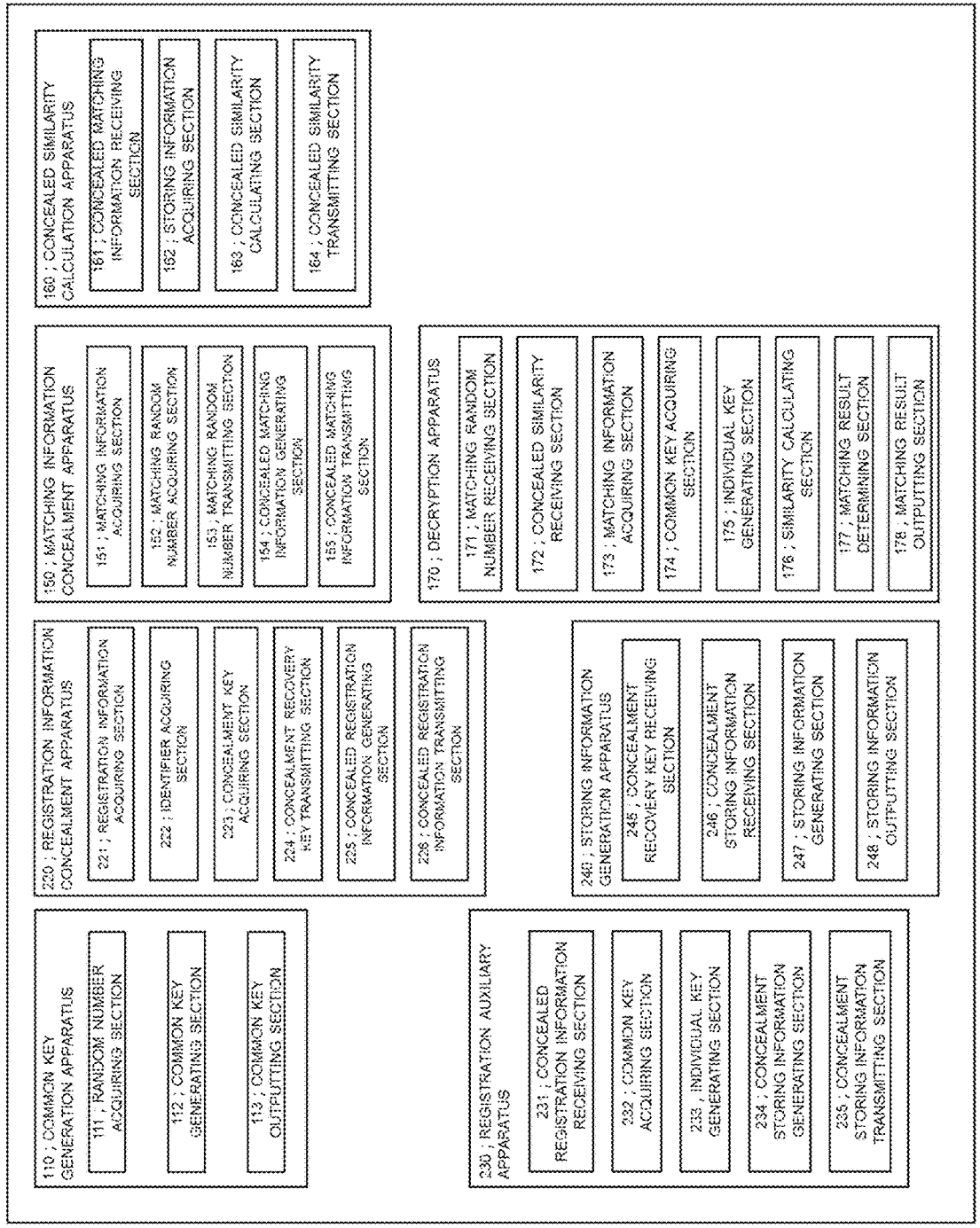
FIG. 7 is a block diagram illustrating a configuration of an information matching system according to a second example embodiment.

FIG. 7 is a block diagram illustrating a configuration of an information matching system 200 according to a second example embodiment. The information matching system 200 includes a common key generation apparatus 110, a registration information concealment apparatus 220, a registration auxiliary apparatus 230, a storing information generation apparatus 240, a matching information concealment apparatus 150, a concealed similarity calculation apparatus 160, and a decryption apparatus 170. The apparatuses included in the information matching system 200 may be configured as separate apparatuses, or may be adequately mounted on an identical apparatus as usage. For example, the information matching system 200 can be achieved as a client-server system by separately mounting the registration information concealment apparatus 220, the storing information generation apparatus 240, and the concealed similarity calculation apparatus 160 on a client, and the common key generation apparatus 110, the registration auxiliary apparatus 230, the matching information concealment apparatus 150, and the decryption apparatus 170 on a server.

Figure 8:
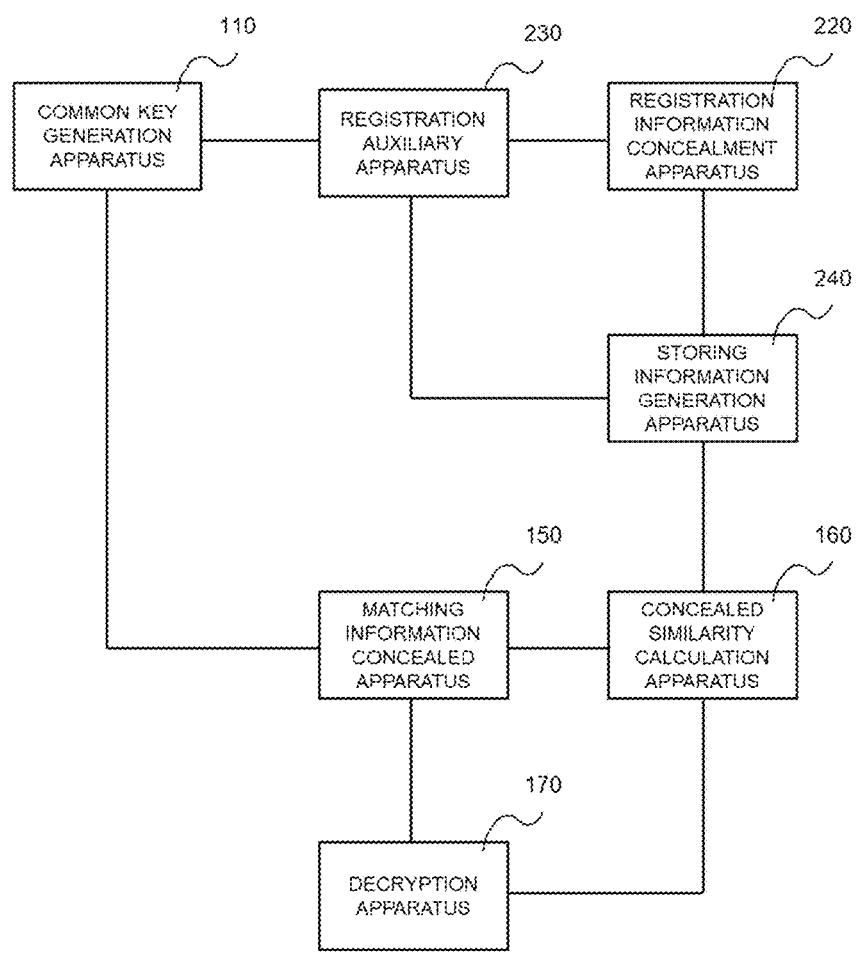
FIG. 8 is a diagram illustrating a connection example of apparatuses included in the information matching system according to the second example embodiment.

The apparatuses illustrated in FIG. 7 (the common key generation apparatus 110, the matching information concealment apparatus 150, the concealed similarity calculation apparatus 160, the decryption apparatus 170, the registration information concealment apparatus 220, the registration auxiliary apparatus 230, and the storing information generation apparatus 240) are connected in a wired or wireless manner and configured to be communicable with each other. For example, the apparatuses included in the information matching system 200 are connected as illustrated in FIG. 8.

The common key generation apparatus 110, the matching information concealment apparatus 150, the concealed similarity calculation apparatus 160, and the decryption apparatus 170 are configured similar to the apparatuses having the same names and reference signs as in the information matching system 100 according to the first example embodiment, and thus, descriptions thereof are omitted.

The registration information concealment apparatus 220 includes a registration information acquiring section 221 that acquires registration information, an identifier acquiring section 222 that acquires an identifier, a concealment key acquiring section 223 that acquires a concealment key a concealment recovery key, a concealment recovery key transmitting section 224 that transmits the concealment recovery key acquired by the concealment key acquiring section 223, a concealed registration information generating section 225 that generates concealed registration information obtained by concealing the registration information acquired by the registration information acquiring section 221 using the concealment key acquired by the concealment key acquiring section 223, and a concealed registration information transmitting section 226 that transmits a pair of the identifier acquired by the identifier acquiring section 222 and the concealed registration information generated by the concealed registration information generating section 225.

The registration auxiliary apparatus 230 includes a concealed registration information receiving section 231 that receives the pair of the identifier and the concealed registration information, a common key acquiring section 232 that acquires a common key, an individual key generating section 233 that generates an individual key from the identifier received by the concealed registration information receiving section 231 and the common key acquired by the common key acquiring section 232, a concealment storing information generating section 234 that generates concealment storing information from the concealed registration information received by the concealed registration information receiving section 231, the common key acquired by the common key acquiring section 232, and the individual key generated by the individual key generating section 233, and a concealment storing information transmitting section 235 that transmits a pair of the identifier received by concealed registration information receiving section 231 and the concealment storing information generated by the concealment storing information generating section 234.

The storing information generation apparatus 240 includes a concealment recovery key receiving section 245 that receives the concealment recovery key, a concealment storing information receiving section 246 that receives the pair of the identifier and the concealment storing information, a storing information generating section 247 that generates storing information by recovering the concealment of the concealment storing information received by the concealment storing information receiving section 246 using the concealment recovery key received by the concealment recovery key receiving section 245, and a storing information outputting section 248 that outputs the storing information generated by the storing information generating section 247.

[Description of Operation]

Next, with reference to the drawings, an entire operation according to the present example embodiment will be described. The operation according to the present example embodiment can be divided into three phases, the common key generation phase, the storing information generation phase, and the matching phase, similar to the first example embodiment.

In the common key generation phase according to the present example embodiment, the common key generation apparatus 110 in the information matching system 200 operates. In the matching phase according to the present example embodiment, the matching information concealment apparatus 150, the concealed similarity calculation apparatus 160, and the decryption apparatus 170 in the information matching system 200 operate. The operations are the same as those in the first example embodiment, and thus, descriptions thereof are omitted.

Figure 9:
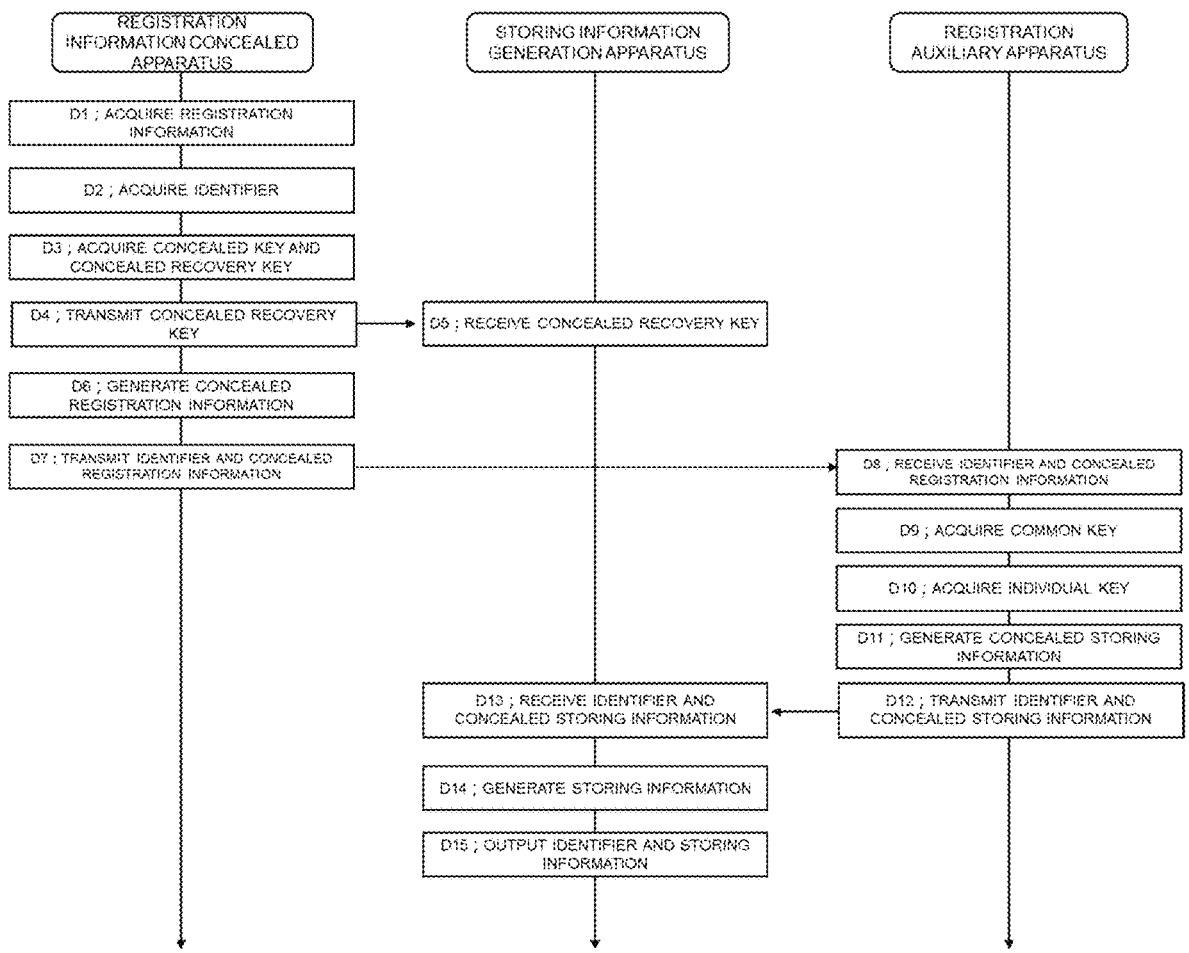
FIG. 9 is a flow diagram illustrating an operation in a storing information generation phase of the information matching system according to the second example embodiment.

In the storing information generation phase according to the present example embodiment, the registration information concealment apparatus 220, the registration auxiliary apparatus 230, and the storing information generation apparatus 240 in the information matching system 200 operate. With reference to FIG. 9, the operation in the storing information generation phase according to the present example embodiment will be described in detail.

First, the registration information acquiring section 221 in the registration information concealment apparatus 220 acquires registration information (step D1). Note that the registration information may be acquired in any way. For example, the registration information may be externally acquired using an input means such as a sensor attached to the registration information concealment apparatus 220.

Next, the identifier acquiring section 222 acquires an identifier (step D2). The identifier is associated with the registration information. For example, in a case that the registration information is biometric information of a person, the identifier may be an identifier indicating a target person. For example, in the case that the registration information is biometric information of a person, and that the storing information generation phase is executed for an identical person a plurality of times, the identifier may be one obtained by combining an identifier indicating a target person and an identifier regarding the number of executions of the storing information generation phase.

Next, the concealment key acquiring section 223 acquires an encryption key (concealment key) and a decryption key (concealment recovery key) of the public key cryptosystem with additive homomorphism (step D3). Note that the encryption key and the decryption key may be generated or acquired in any way. For example, those two keys may be generated using a key generating function that the registration information concealment apparatus 220 has therein, or two keys generated outside the registration information concealment apparatus 220 may be acquired.

Next, the concealment recovery key transmitting section 224 transmits the decryption key acquired by the concealment key acquiring section 223 to the storing information generation apparatus 240 (step D4).

Next, the concealment recovery key receiving section 245 in the storing information generation apparatus 240 receives the decryption key (the concealment recovery key) from the registration information concealment apparatus 220 (step D5).

Next, the concealed registration information generating section 225 encrypts the registration information acquired by the registration information acquiring section 221 using the encryption key (the concealment key) acquired by the concealment key acquiring section 223 to obtain the obtained encrypted value as concealed registration information (step D6).

Next, the concealed registration information transmitting section 226 transmits a pair of the identifier acquired by the identifier acquiring section 222 and the concealed registration information generated by the concealed registration information generating section 225 to the registration auxiliary apparatus 230 (step D7).

Next, the concealed registration information receiving section 231 in the registration auxiliary apparatus 230 receives the pair of the identifier and the concealed registration information from the registration information concealment apparatus 220 (step D8).

Next, the common key acquiring section 232 acquires the common key output by the common key generation apparatus 110 in step A3 (step D9). Note that the common key may be acquired in any way. For example, the common key may be stored in advance in a storing means provided in the registration auxiliary apparatus 230, or a common key may be acquired every time from a storing means outside the registration auxiliary apparatus 230.

Next, the individual key generating section 233 generates an individual key from the identifier acquired by the concealed registration information receiving section 231 in step D8 and the common key acquired by the common key acquiring section 232 in step D9 (step D10).

Next, the concealment storing information generating section 234 generates concealment storing information from the concealed registration information acquired by the concealed registration information receiving section 231 in step D8, the common key acquired by the common key acquiring section 232 in step D9, and the individual key generated by the individual key generating section 233 in step D10 (step D11).

Next, the concealment storing information transmitting section 235 transmits a pair of the identifier received by the concealed registration information receiving section 231 and the concealment storing information generated by the concealment storing information generating section 234 in step D11 to the storing information generation apparatus 240 (step D12).

Next, the concealment storing information receiving section 246 receives the pair of the identifier and the concealment storing information from the registration auxiliary apparatus 230 (step D13).

Next, the storing information generating section 247 generates storing information by recovering the concealment of the concealment storing information received by the concealment storing information receiving section 246 in step D13 using the decryption key (the concealment recovery key) received by concealment recovery key receiving section 245 in step D5 (step D14).

Finally, the storing information outputting section 248 outputs a pair of the identifier received by the concealment storing information receiving section 246 in step D13 and the storing information generated by the storing information generating section 247 in step D14 (step D15).

Note that the order of performing the steps is not limited to that described above. For example, before acquiring the registration information in step D1, steps independent from the registration information (transmitting the identifier in steps D2, D3, D4, D5, and D7, receiving the identifier in step D8, steps D9 and D10) may be performed.

Concrete Example according to Second Example Embodiment

Next, a concrete example of the operation of the information matching system 200 according to the present example embodiment will be described.

In this concrete example, a case that ECElgamal encryption scheme is used will be described. Assume that a group with an order of a κ-bit prime number q on an elliptic curve E and a generator G of the group are published.

In this concrete example, a hash function is used. Although the hash function to be used is not limited, assume that the registration auxiliary apparatus 230 and the decryption apparatus 170 have knowledge of the hash function to be used, in advance. Hereinafter, the hash function to be used is referred to as Hash.

In this concrete example, a case that a vector (with a dimension number of D) is used as the matching information and the registration information will be described. Furthermore, a case that the similarity between the matching information and the registration information is calculated by use of an inner product of two vectors will be described. Assume a case that the matching information and the registration information are determined to be sufficiently similar to each other is a case that a similarity calculated by use of the inner product of the matching information and the registration information matches any one of T values $\theta_1, \ldots,$ and $\theta_\tau$.

The operations in the common key generation phase and the matching phase according to this concrete example are similar to the operations in the common key generation phase and the matching phase in the concrete example according to the first example embodiment, and thus, descriptions thereof are omitted.

The operation in the storing information generation phase according to this concrete example will be described.

First, the registration information acquiring section 221 in the registration information concealment apparatus 220 acquires, as the registration information, a D-dimensional vector:
$x=(x_1, \ldots, x_D)$
(step D1).

Next, the identifier acquiring section 222 acquires an identifier ID (step D2).

Next, the concealment key acquiring section 223 performs a key generation algorithm of the ECElgamal to acquire an encryption key ek' and a decryption key dk' (step D3).

Next, the concealment recovery key transmitting section 224 transmits the decryption key dk' acquired by the concealment key acquiring section 223 to the storing information generation apparatus 240 (step D4).

Next, the concealment recovery key receiving section 245 in the storing information generation apparatus 240 receives the decryption key dk' from the registration information concealment apparatus 220 (step D5).

Next, the concealed registration information generating section 225 calculates $X_j = \text{Enc}(ek', x_j)$ for all $j=1, \ldots, D$
from the registration information $x=(x_1, \ldots, x_D)$ acquired by the registration information acquiring section 221, and
the encryption key ek' acquired by the concealment key acquiring section 223
to obtain a pair of ek' and $X=(X_1, \ldots, X_D)$ as concealed registration information (step D6).

Next, the concealed registration information transmitting section 226 transmits a pair of the identifier ID acquired by the identifier acquiring section 222 and the concealed registration information (ek', X) generated by the concealed registration information generating section 225 to the registration auxiliary apparatus 230 (step D7).

Next, the concealed registration information receiving section 231 in the registration auxiliary apparatus 230 receives the pair of the identifier and the concealed registration information (ID, (ek', X)) from the registration information concealment apparatus 220 (step D8).

Next, the common key acquiring section 232 acquires the common key (a, K) output by the common key generation apparatus 110 in step A3 (step D9).

Next, the individual key generating section 233 calculates hash values $h_{ID, j} = \text{Hash}(K, ID, j)$ for all $j=1, \ldots, D$
from the identifier ID acquired by the concealed registration information receiving section 231 in step D8 and
the common key (a, K) acquired by the common key acquiring section 232 in step D9 to obtain individual keys $h_{ID} = (h_{ID, 1}, \ldots, h_{ID, D})$ (step D10).

Next, the concealment storing information generating section 234 calculates $Z'_{ID, j} = \text{HomScl}(ek', \text{HomAdd}(ek', X_j, \text{Enc}(ek', -h_{ID, j})), a)$ for all $j=1, \ldots, D$
from the concealed registration information (ek', $X=(X_1, \ldots, X_D)$) acquired by the concealed registration information receiving section 231 in step D8,
the common key (a, K) acquired by the common key acquiring section 232 in step D9, and
the individual keys $h_{ID} = (h_{ID, 1}, \ldots, h_{ID, D})$ generated by the individual key generating section 233 in step D10
to obtain $Z'_{ID} = (Z'_{ID, 1}, \ldots, Z'_{ID, D})$ as concealment storing information (step D11).

Note that, for $j=1, \ldots, D$, because $X_j = \text{Enc}(ek', x_j)$ is satisfied,
$Z'_{ID, j} = \text{Enc}(ek', a(x_j - h_{ID, j}))$ is satisfied.

Note that $a(x_j - h_{ID, j})$ calculated in generating the concealment storing information corresponds to the storing information obtained by linearly converting the registration information.

Next, the concealment storing information transmitting section 235 transmits a pair of the identifier ID received by the concealed registration information receiving section 231 and the concealment storing information $Z'_{ID} = (Z'_{ID, 1}, \ldots, Z'_{ID, D})$ generated by the concealment storing information generating section 234 in step D11 to the storing information generation apparatus 240 (step D12).

Next, the concealment storing information receiving section 246 receives the pair (ID, $Z'_{ID}$) of the identifier and the concealment storing information from the registration auxiliary apparatus 230 (step D13).

Next, the storing information generating section 247 calculates $z_{ID, j} = \text{Dec}(dk', Z'_{ID, j})$ for all $j=1, \ldots, D$
from the concealment recovery key dk' received by the concealment recovery key receiving section 245 in step D5 and
the concealment storing information $Z'_{ID} = (Z'_{ID, 1}, \ldots, Z'_{ID, D})$ received by the concealment storing information receiving section 246 in step D13
to obtain $z_{ID} = (z_{ID, 1}, \ldots, z_{ID, D})$ as storing information (step D14).

Note that, for $j=1, \ldots, D$, because $Z'_{ID, j} = \text{Enc}(ek', a(x_j - h_{ID, j}))$ is satisfied,
$z_{ID, j} = a(x_j - h_{ID, j})$ is satisfied.

Finally, the storing information outputting section 248 outputs a pair (ID, $z_{ID}$) of the identifier ID received by the concealment storing information receiving section 246 in step D13 and the storing information $z_{ID}$ generated by the storing information generating section 247 in step D14 (step D15).

Description of Effect

The present example embodiment described above also has an effect that, in addition to the effect of the first example embodiment, the storing information can be securely generated. This is because the registration information, when being transmitted to outside the registration information concealment apparatus 220, is concealed, and the common key is handled by the registration auxiliary apparatus 230 that is different from the registration information concealment apparatus 220 handling the registration information, and then storing information is generated.

The techniques according to the present invention make it possible to match information generated from registered information and stored in a client device, and information newly acquired by a server device not having the information for each client device, while these pieces information are concealed and further the client device is prevented from using information other than the stored information.

The techniques according to the present invention can be used for, for example, the payment means by use of the biometric authentication without need for presentation or reading of a card or a device such as a smartphone, as described above. A mobile device such as a smartphone of a customer is used as the client device, and a payment device installed at each shop is used as the server device. Because information per customer does not need to be stored in the payment device, a customer to make a payment can be identified even if a customer visiting the shop cannot be identified in advance.

The techniques according to the present invention can be used for, for example, an entrance gate to determine whether a person is permitted to enter by use of the biometric authentication. A mobile device of a person who wants to enter is used as the client device, and a device at the gate is used as the server device. Because information per customer does not need to be stored in the gate device, the person who wants to enter can be identified even if which gate the person who wants to enter passes through cannot be identified in advance. Note that an applicable example of the present invention is not limited to the above described examples.

Figure 10:
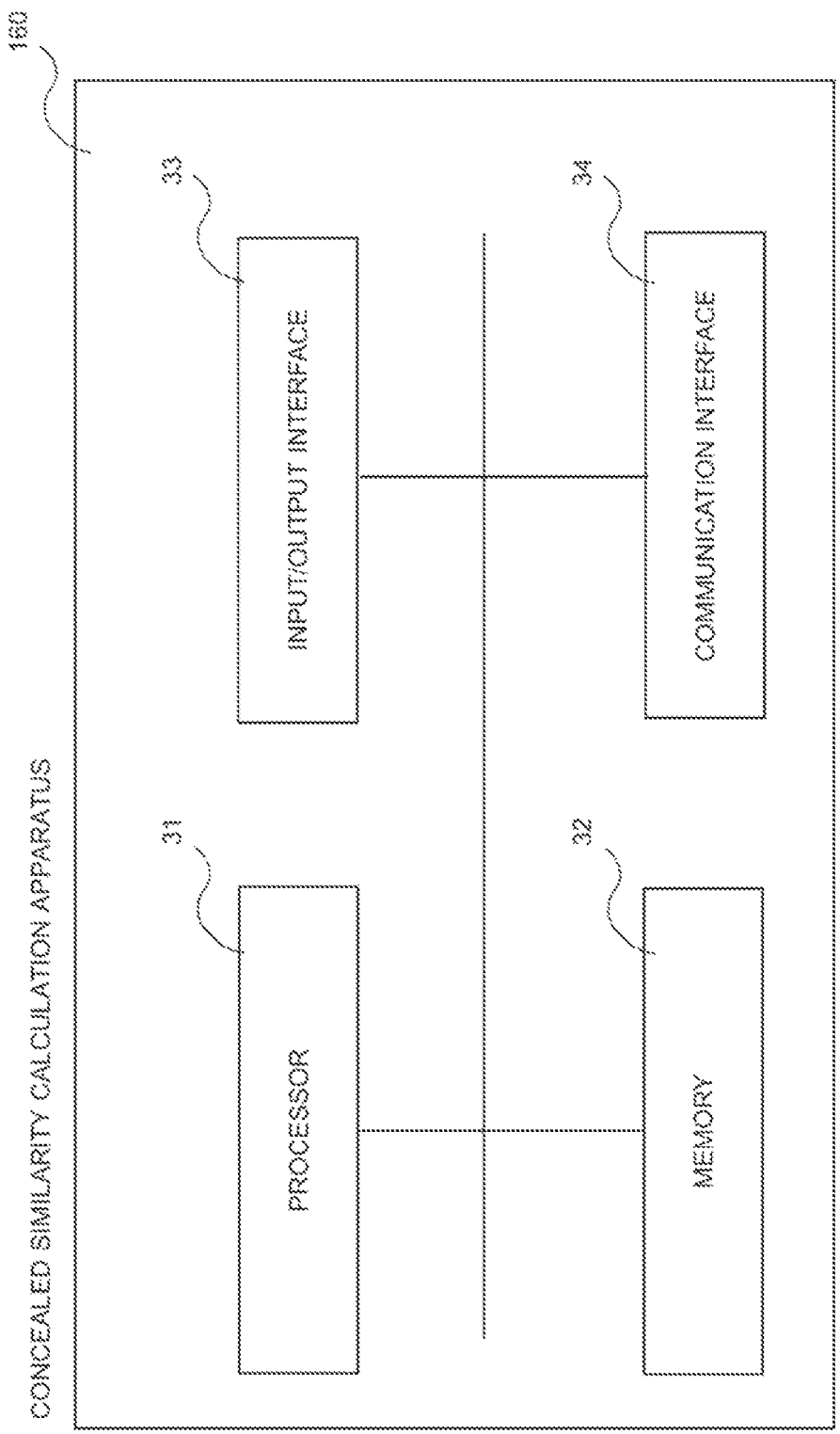
FIG. 10 is a diagram illustrating an example of a hardware configuration of a concealed similarity calculation apparatus.

Subsequently, hardware of the apparatuses constituting the information matching system will be described. FIG. 10 is a diagram illustrating an example of a hardware configuration of the concealed similarity calculation apparatus 160.

The concealed similarity calculation apparatus 160 can be configured with an information processing apparatus (so-called, a computer), and includes a configuration illustrated in FIG. 10. For example, the concealed similarity calculation apparatus 160 includes a processor 31, a memory 32, an input/output interface 33, a communication interface 34, and the like. Constituent elements such as the processor 31 are connected to each other via an internal bus or the like, and are configured to be communicable with each other.

However, the configuration illustrated in FIG. 10 is not intended to limit the hardware configuration of the concealed similarity calculation apparatus 160. The concealed similarity calculation apparatus 160 may include hardware not illustrated, or need not include the input/output interface 33 as necessary. The number of processors 31 and the like included in the concealed similarity calculation apparatus 160 is not intended to limit to the example illustrated in FIG. 10, and for example, a plurality of processors 31 may be included in the concealed similarity calculation apparatus 160.

The processor 31 is, for example, a programmable device such as a central processing unit (CPU), a micro processing unit (MPU), and a digital signal processor (DSP). Alternatively, the processor 31 may be a device such as a field programmable gate array (FPGA) and an application specific integrated circuit (ASIC). The processor 31 executes various programs including an operating system (OS).

The memory 32 is a random access memory (RAM), a read only memory (ROM), a hard disk drive (HDD), a solid state drive (SSD), or the like. The memory 32 stores an OS program, an application program, and various pieces of data.

The input/output interface 33 is an interface of a display apparatus or an input apparatus (not illustrated). The display apparatus is, for example, a liquid crystal display or the like. The input apparatus is, for example, an apparatus that receives user operation, such as a keyboard and a mouse.

The communication interface 34 is a circuit, a module, or the like that performs communication with another apparatus. For example, the communication interface 34 includes a network interface card (NIC) or the like.

The function of the concealed similarity calculation apparatus 160 is implemented by various processing modules. Each of the processing modules is, for example, implemented by the processor 31 executing a program stored in the memory 32. The program can be recorded on a computer readable storing medium. The storing medium can be a non-transitory storing medium, such as a semiconductor memory, a hard disk, a magnetic recording medium, and an optical recording medium. In other words, the present invention can also be implemented as a computer program product. The program can be updated through downloading via a network, or by using a storing medium storing a program. In addition, the processing module may be implemented by a semiconductor chip.

Note that the common key generation apparatus 110, the storing information generation apparatus 140, and the like also can be configured by the information processing apparatus similar to the concealed similarity calculation apparatus 160, and their basic hardware structures are not different from the concealed similarity calculation apparatus 160, and thus, the descriptions thereof are omitted.

[Example Alterations]

Note that the configuration, the operation, and the like of the information matching system described in the example embodiments are merely examples, and are not intended to limit the configuration and the like of the system. For example, a database server or the like may be provided that stores the information (for example, concealed matching information, or the like) transmitted or received between the apparatuses to communicate the information via the database server.

In a plurality of flowcharts (sequence diagram) used in the above description, a plurality of steps (processes) are described in order, but the order of performing of the steps performed in each example embodiment is not limited to the described order. In each example embodiment, the illustrated order of processes can be changed as far as there is no problem with regard to processing contents, such as a change in which respective processes are executed in parallel, for example. The example embodiments described above can be combined in a scope that the contents do not conflict.

The whole or part of the example embodiments disclosed above can be described as, but not limited to, the following supplementary notes.

[Supplementary Note 1]

An information matching system includes a common key generation apparatus (11, 110), a storing information generation apparatus (12, 140, 240), a matching information concealment apparatus (13, 150), a concealed similarity calculation apparatus (14, 160), a decryption apparatus (15, 170), wherein the common key generation apparatus (11, 110) is configured to generate a common key, the storing information generation apparatus (12, 140, 240) is configured to obtain registration information and an identifier capable of identifying the registration information, to generate a first individual key from the common key and the identifier, and to generate storing information obtained by linearly converting the registration information using the common key and the first individual key, the matching information concealment apparatus (13, 150) is configured to obtain matching information and to generate concealed matching information concealing the matching information using an encryption key, the concealed similarity calculation apparatus (14, 160) is configured to calculate a concealed similarity from the storing information and the concealed matching information, and the decryption apparatus (15, 170) is configured to generate a second individual key from the common key and the identifier, and to calculate a similarity between the registration information and the matching information from the concealed similarity, a decryption key corresponding to the encryption key, the common key, and the second individual key.

[Supplementary Note 2]

The information matching system according to the supplementary note 1, further includes a registration information concealment apparatus, and a registration auxiliary apparatus, wherein the registration information concealment apparatus is configured to obtain the registration information to generate concealed registration information concealing the registration information, the registration auxiliary apparatus is configured to generate a third individual key from the common key and an identifier capable of identifying the registration information, and to generate concealment storing information which is a value concealing storing information obtained by linearly converting the registration information using the common key and the third individual key, and the storing information generation apparatus (12, 140, 240) is configured to generate the storing information by recovering the concealment of the concealment storing information.

[Supplementary Note 3]

The information matching system according to the supplementary note 1 or 2, wherein each of the first, second, and third individual keys has a hash value calculated by inputting a value including the common key and the identifier capable of identifying the registration information, and the storing information and the similarity are calculated using the hash value.

[Supplementary Note 4]

The information matching system according to any one of the supplementary notes 1 to 3, wherein the matching information concealment apparatus (13, 150) is configured to calculate the concealed matching information by encrypting the matching information using a cryptosystem with homomorphism, and the decryption apparatus (15, 170) is configured to calculate the similarity by decrypting the concealed similarity using the cryptosystem with homomorphism.

[Supplementary Note 5]

The information matching system according to the supplementary note 2, wherein the registration information concealment apparatus is configured to calculate the concealed registration information by encrypting the registration information using a cryptosystem with homomorphism, and the storing information generation apparatus (12, 140, 240) is configured to calculate the storing information by decrypting the concealment storing information using the cryptosystem with homomorphism.

[Supplementary Note 6]

An information matching method including, in an information matching system including a common key generation apparatus (11, 110), a storing information generation apparatus (12, 140, 240), a matching information concealment apparatus (13, 150), a concealed similarity calculation apparatus (14, 160), a decryption apparatus (15, 170), generating, by the common key generation apparatus (11, 110), a common key, obtaining, by the storing information generation apparatus (12, 140, 240), registration information and an identifier capable of identifying the registration information, to generate a first individual key from the common key and the identifier, and to generate storing information obtained by linearly converting the registration information using the common key and the first individual key, obtaining, by the matching information concealment apparatus (13, 150), matching information and to generate concealed matching information concealing the matching information using an encryption key, calculating, by the concealed similarity calculation apparatus (14, 160), a concealed similarity from the storing information and the concealed matching information, and generating, by the decryption apparatus (15, 170), a second individual key from the common key and the identifier, and to calculate a similarity between the registration information and the matching information from the concealed similarity, a decryption key corresponding to the encryption key, the common key, and the second individual key.

Note that the example aspect of the supplementary note 6 can be expanded, similar to the example aspect of the supplementary note 1, to the example aspects of the supplementary notes 2 to 5.

Note that the disclosures of the cited literatures in the citation list are incorporated by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST 11, 110 Common Key Generation Apparatus
12, 140, 240 Storing information Generation Apparatus
13, 150 Matching Information Concealment Apparatus
14, 160 Concealed Similarity Calculation Apparatus
15, 170 Decryption Apparatus
31 Processor
32 Memory
33 Input/Output Interface
34 Communication Interface
100, 200 Information Matching System
111 Random Number Acquiring Section
112 Common Key Generating Section
113 Common Key Outputting Section
141, 221 Registration Information Acquiring Section
142, 222 Identifier Acquiring Section
143 Common Key Acquiring Section
144 Individual Key Generating Section
147, 247 Storing information Generating Section
148, 248 Storing information Outputting Section
151 Matching Information Acquiring Section
152 Matching Random Number Acquiring Section
153 Matching Random Number Transmitting Section
154 Concealed Matching Information Generating Section
155 Concealed Matching Information Transmitting Section
161 Concealed Matching Information Receiving Section
162 Storing information Acquiring Section
163 Concealed Similarity Calculating Section 164 Concealed Similarity Transmitting Section
171 Matching Random Number Receiving Section
172 Concealed Similarity Receiving Section
173 Matching Information Acquiring Section
174, 232 Common Key Acquiring Section
175, 233 Individual Key Generating Section
176 Similarity Calculating Section
177 Matching Result Determining Section
178 Matching Result Outputting Section
220 Registration Information Concealment Apparatus
223 Concealment Key Acquiring Section
224 Concealment Recovery Key Transmitting Section
225 Concealed Registration Information Generating Section
226 Concealed Registration Information Transmitting Section
230 Registration Auxiliary Apparatus
231 Concealed Registration Information Receiving Section
234 Concealment Storing information Generating Section
235 Concealment Storing information Transmitting Section
245 Concealment Recovery Key Receiving Section
246 Concealment Storing information Receiving Section

What is claimed is:

1. An information matching system comprising:
a common key generation apparatus;
a storing information generation apparatus;
a matching information concealment apparatus;
a concealed similarity calculation apparatus; and
a decryption apparatus, wherein
the common key generation apparatus is configured to generate a common key,
the storing information generation apparatus is configured to obtain registration information and an identifier capable of identifying the registration information, to generate a first individual key from the common key and the identifier, and to generate storing information obtained by linearly converting the registration information using the common key and the first individual key,
the matching information concealment apparatus is configured to obtain matching information and to generate concealed matching information concealing the matching information using an encryption key,
the concealed similarity calculation apparatus is configured to calculate a concealed similarity from the storing information and the concealed matching information, and
the decryption apparatus is configured to generate a second individual key from the common key and the identifier, and to calculate a similarity between the registration information and the matching information from the concealed similarity, a decryption key corresponding to the encryption key, the common key, and the second individual key.

2. The information matching system according to claim 1, further comprising:
a registration information concealment apparatus; and
a registration auxiliary apparatus, wherein
the registration information concealment apparatus is configured to obtain the registration information to generate concealed registration information concealing the registration information,
the registration auxiliary apparatus is configured to generate a third individual key from the common key and the identifier capable of identifying the registration information, and to generate concealment storing information which is a value concealing storing information obtained by linearly converting the registration information using the common key and the third individual key, and
the storing information generation apparatus is configured to generate the storing information by recovering the concealment of the concealment storing information.

3. The information matching system according to claim 1, wherein each of the first, second, and third individual keys has a hash value calculated by inputting a value including the common key and the identifier capable of identifying the registration information, and the storing information and the similarity are calculated using the hash value.

4. The information matching system according to claim 1, wherein
the matching information concealment apparatus is configured to calculate the concealed matching information by encrypting the matching information using a cryptosystem with homomorphism, and
the decryption apparatus is configured to calculate the similarity by decrypting the concealed similarity using the cryptosystem with homomorphism.

5. The information matching system according to claim 2, wherein the registration information concealment apparatus is configured to calculate the concealed registration information by encrypting the registration information using a cryptosystem with homomorphism, and
the storing information generation apparatus is configured to calculate the storing information by decrypting the concealment storing information using the cryptosystem with homomorphism.

6. An information matching method comprising, in an information matching system including a common key generation apparatus, a storing information generation apparatus, a matching information concealment apparatus, a concealed similarity calculation apparatus, and a decryption apparatus:
generating, by the common key generation apparatus, a common key;
obtaining, by the storing information generation apparatus, registration information and an identifier capable of identifying the registration information, to generate a first individual key from the common key and the identifier, and to generate storing information obtained by linearly converting the registration information using the common key and the first individual key;
obtaining, by the matching information concealment apparatus, matching information and to generate concealed matching information concealing the matching information using an encryption key;
calculating, by the concealed similarity calculation apparatus, a concealed similarity from the storing information and the concealed matching information; and
generating, by the decryption apparatus, a second individual key from the common key and the identifier, and to calculate a similarity between the registration information and the matching information from the concealed similarity, a decryption key corresponding to the encryption key, the common key, and the second individual key.

* * * * *